F. W. WOOD.
SIGNAL APPARATUS.
APPLICATION FILED MAR. 11, 1914.
1,111,345.
Patented Sept. 22, 1914.
2 SHEETS—SHEET 1.
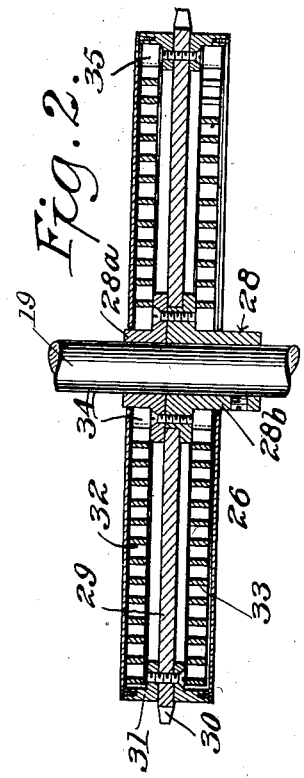
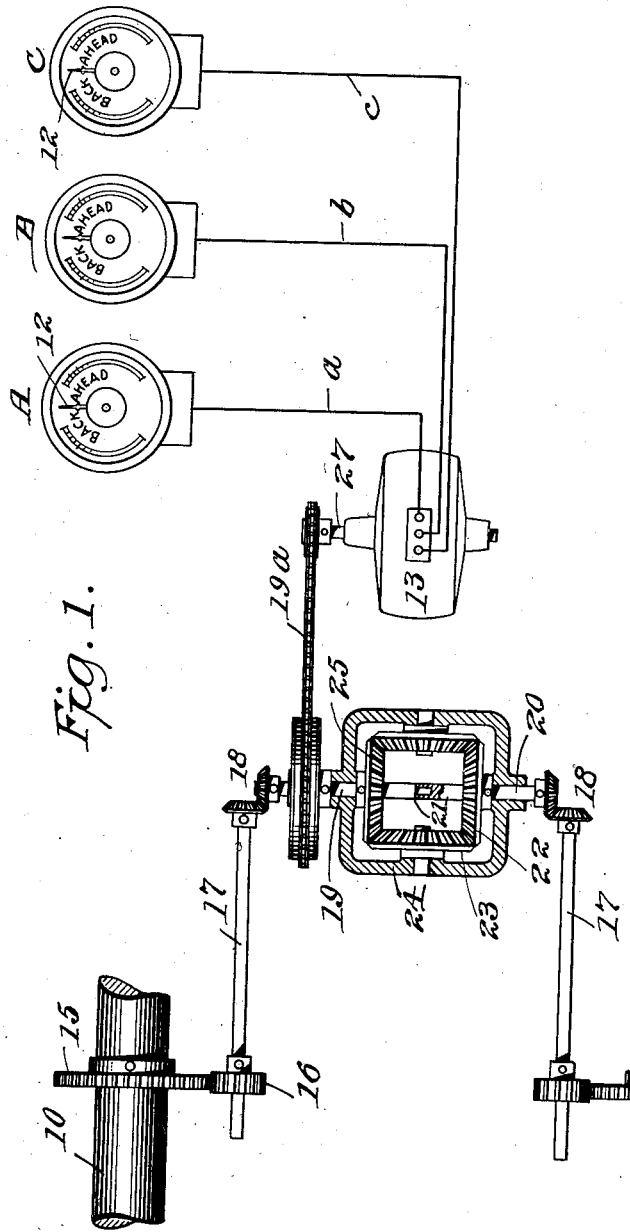
WITNESSES
A. R. Appleman
W. H. Hawkins
INVENTOR
Frank W. Wood
BY
Meyers, Cushman & Rea
ATTORNEYS

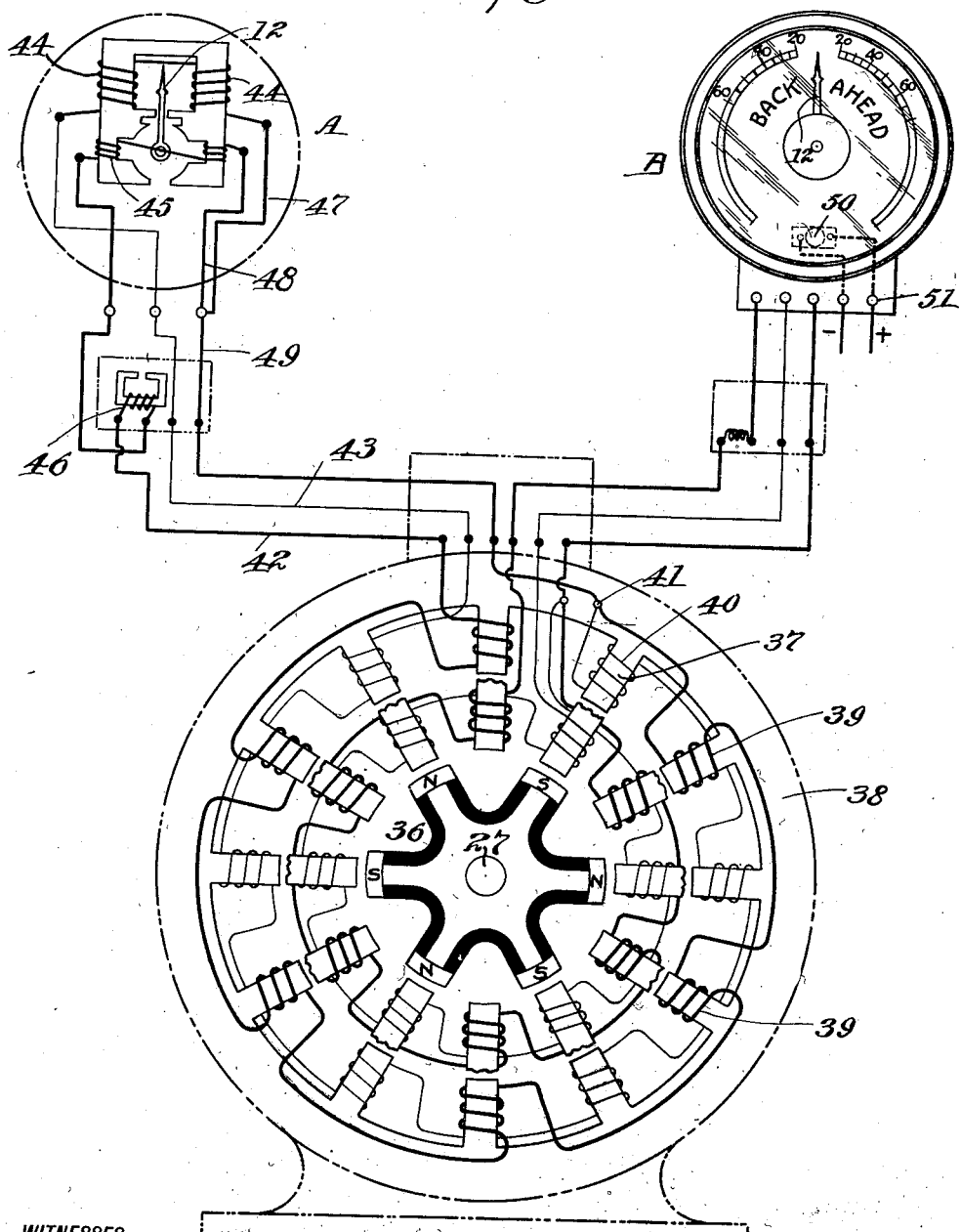

UNITED STATES PATENT OFFICE.

FRANK W. WOOD, OF BROOKLYN, NEW YORK, ASSIGNOR TO CHARLES CORY & SON INCORPORATED, OF NEW YORK, N. Y., A CORPORATION OF NEW YORK.

SIGNAL APPARATUS.

1,111,345.  Specification of Letters Patent.  Patented Sept. 22, 1914.

Application filed March 11, 1914. Serial No. 823,926.

*To all whom it may concern:*

Be it known that I, FRANK W. WOOD, a citizen of the United States, residing at Brooklyn, in the county of Kings and State of New York, have invented new and useful Improvements in Signal Apparatus, of which the following is a specification.

This invention relates to signaling apparatus and is particularly applicable where the same signal must be transmitted to different points. It is also particularly applicable as means for indicating the speed of rotation of a shaft or a plurality of shafts, and in this connection it has special usage aboard ship for indicating the speed of the shaft or the speed of the twin shafts or triple shafts where the vessel has a twin screw drive or a triple screw drive.

A principal object of the invention is to provide apparatus including a plurality of indicators disposed respectively at different points, and arranged so that if one of the indicators or its controlling circuit is injured the other indicator or indicators will continue to operate. In other words the arrangement is such that the indicators are independent of each other.

A further object of the invention is to provide an arrangement whereby a speed of rotation of the shaft, which is variable may be imparted to the indicators in such a way that the indicating needles or pointers will not fluctuate with the slight variations in speed of the shaft, but will remain substantially steady. Such slight variations may occur in each revolution of the shaft. This is particularly true of marine engines, or other engines operating without a fly wheel.

A further object of the invention is to provide means whereby a plurality of indicators may be controlled by a plurality of shafts, and in such a way that if all the shafts are running the indicators will indicate the average speed thereof, but if any shaft is held stationary the indicators will give the average speed of the remaining shafts. This feature of enabling the indicators to indicate the average speed of a plurality of shafts is particularly desirable in connection with marine engines, as it eliminates the computations on the different shaft speeds necessary to obtain the average.

A further object of the invention is to provide an arrangement whereby the indicators not only indicate the speed but the direction of the shaft.

The general object of the invention is to provide simple means for controlling an indicator or indicators on a shaft or plurality of shafts, or other rotating parts.

In the accompanying drawings Figure 1 is a diagrammatic view illustrating one embodiment of the invention, and representing it as applied to two shafts and controlling the three indicators. Fig. 2 is a longitudinal cross section through a flexible drive connection which may constitute a feature of my invention, the purpose of which is to absorb slight variations in the rotation speed and cause a "dampening" or steadying effect of the indicator needle. Fig. 3 is a diagrammatic view indicating the preferred form of the wiring apparatus.

Referring more particularly to the parts 10 and 11 represent a plurality of shafts the speed of rotation of which is to be indicated or signaled. It may be desired to signal the speeds of these shafts to several points, as for instance on ship board to the engine room, gun tower, and tower platform. At these points I may provide three indicators indicated by A, B, and C. In order to control the pointers or needles 12 of these indicators I prefer to impart the rotation of the shafts 10 and 11 to a generator 13 of the type illustrated in Fig. 3, and I prefer to drive this generator from the shafts 10 and 11 by means of a differential gear 14. For this purpose the shafts 10 and 11 may be provided with gear wheels 15 which mesh with pinions 16, said pinions being carried respectively on shafts 17, which drive meshing beveled gears 18 on oppositely disposed alining shafts 19, the shafts 20 being arranged to be driven from the shaft 11.

The ends of the shafts 19, 20, have a swivel connection 21, the shaft 20 carries a beveled gear 22 which meshes with two oppositely disposed beveled gears 23 carried in the differential frame 24, and these beveled gears 23 mesh with opposite sides of a beveled gear 25 which is carried rigidly by shaft 19. One of these shafts 19 or 20, for instance the shaft 19 carries a driving connection 26 for driving the shaft 27 of the generator 13, preferably by a sprocket chain 19ª. This driving connection may be a simple sprocket wheel if desired, but it preferably has a special function residing in a construction such as that illustrated in Fig. 2, that is it is a flexible connection tending to absorb slight variations in speed of rotation of the shaft 10 and impart a substantially steady and unvarying speed of rotation to the shaft 27, the object being to prevent variations or tremors in the indicating needles 12. This flexible connection 26 preferably comprises a hub 28 which is rigid on the shaft 19, and formed of two connected sections 28ª and 28ᵇ, and these sections secure loosely between them a disk 29, the outer edge of which is formed into sprocket teeth 30 near which a rim 31 is clamped. It is understood that the disk 29 is loose on the hub 28. In order that the rotation of the shaft will rotate the driving connection I provide springs 32 and 33, on opposite sides of the disk 29, which are preferably of spiral form, the inner ends being connected to the hub as at 34 and the outer ends being connected to the rim as at 35. These springs are preferably coiled in opposite directions so that one operates to impart a rotation to the rim from the shaft when the shaft rotates in one direction, and the other performs the same function for the opposite direction of rotation.

The generator 13 is preferably a two-phase alternating generator with separate windings corresponding to the different indicators. In Fig. 3 in order to avoid confusion I have illustrated simply a wiring for two of the indicators, but for three indicators there would be another winding arranged like the separate windings shown. This generator preferably carries on its shaft 27 a rotating field 36 having a plurality of permanent magnetic poles preferably of half the number of the armature poles 37 of the armature ring 38. The armature coils 39 of alternate poles are connected in series while the intermediate coils 40 are similarly connected, but on a branch from the point 41 so that from this point 41 there are two windings in parallel taking the alternate coils in series. In this way passing from the generator we have a conductor 42 which takes the current generated in the coils 39 and the wire 43 taking the current from the coils 40. Evidently the phases of the currents in the conductors 42 and 43 are opposite to each other. These conductors are connected with the indicators preferably by electric cables a, b, and c, and by the wiring indicated in Fig. 3. Such an indicator may be provided with two oppositely disposed main field coils 44 and a pair of smaller field coils 45, the former coils 44 being connected in series with the conductor 43 and the coils 45 being connected in series with the conductor 42.

In one or other of the conductors 42, 43, I prefer to connect a regulating coil such as the coil 46 which may be adjusted to regulate the needle 12 of the indicator. The coils 44 and 45 are connected by parallel conductors 47 and 48 with a common return conductor 49 which leads back to the point 41. The poles of the field 27 are of alternate character, so that when the field is rotated opposite phases are generated in the conductors 42 and 43. If the generator is rotated in a reverse direction these phases will be reversed and the needle 12 will be moved in reverse direction therefrom. Hence the indicators may indicate a rotation of the shafts in either direction. For instance in a marine engine they will indicate "ahead" or "astern."

Where it is necessary to illuminate the indicator this is most conveniently done by means of a small lamp 50 having terminals 51 for connection with a lighting circuit.

In this apparatus the load is always the same and the system cannot become unbalanced.

It is understood that the embodiment of the invention described above is only one of the many forms or embodiments the invention may take, and I do not wish to be limited in the practice of my invention, nor in the construction of my claims to the particular embodiment set forth.

What I claim is:—

1. In apparatus of the class described in combination a generator arranged to be driven by a rotating part, a plurality of independent circuits passing through said generator, and a speed indicator in each of said circuits controlled by the current in its circuit and independent of the current in the other circuits.

2. In apparatus of the class described in combination a generator arranged to be driven by a rotating part, a plurality of independent circuits passing through said generator, and a speed indicator in each of said circuits indicating the speed and direction of rotation of the rotating part controlled by the current in its circuit and independent of the current in the other circuits.

3. In apparatus of the class described in combination a generator, a flexible driving connection for driving said generator from a rotating part, a plurality of independent circuits passing through said generator, and a speed indicator in each of said circuits controlled by the current in its circuit and independent of the current in the other circuits.

4. In apparatus of the class described in combination a plurality of rotating parts, a plurality of indicating devices independent of each other, and means for controlling all of said indicating devices from all of said rotating parts.

5. In apparatus of the class described in combination a plurality of rotating parts, a plurality of indicating devices independent of each other, a driving device for driving said indicating devices, and a differential mechanism for actuating said driving device from said rotating parts.

6. In apparatus of the class described in combination a plurality of rotating parts, a plurality of indicators, a shaft adapted to be driven at a variable speed, indicating mechanism for indicating the speed of said shaft, and a flexible driving connection for driving said indicating mechanism from said shaft and adapted to absorb variations in the rotating speed of said shaft to impart a substantially uniform torque effect to said indicating mechanism.

7. In apparatus of the class described in combination a differential gear, a plurality of shafts for driving said differential gear, a generator driven from said differential gear, a plurality of indicators connected with said generator and adapted to indicate the direction and average speed of said shafts, and circuits connecting said generator with said indicating devices.

8. In apparatus of the class described in combination a differential gear, a plurality of shafts for driving said differential gear, a generator driven from said differential gear, a plurality of indicators connected with said generator and adapted to indicate the direction and average speed of said shafts, circuits connecting said generator with said indicating devices, and a flexible connection between said differential gear and said generator tending to absorb variations in the speed of rotation of said shafts and transmit a substantial uniform speed of rotation to said generator.

9. In apparatus of the class described, a shaft, an alternating current generator driven thereby, and an indicator actuated by said generator indicating the revolutions per minute and the direction of rotation of said shaft.

10. In a speed and direction indicating apparatus, the combination with a plurality of rotating parts, of an electric generator, a differential gear, separate driving connections between said rotating parts and differential gear, a driving connection between the said gear and generator, and an electrical indicator in circuit with the generator and influenced thereby for indicating the average speed of the said rotating parts.

11. In a speed and direction indicating apparatus, the combination with a plurality of rotating parts, of an electric generator, a differential gear, separate driving connections between said rotating parts and differential gear, a driving connection between the said gear and generator, and an electrical indicator in circuit with the generator, said indicator having a pointer movable in either direction to indicate the average speed and direction of rotation of said rotating parts.

In testimony whereof I have hereunto set my hand in presence of two subscribing witnesses.

FRANK W. WOOD.

Witnesses:
J. GRANVILLE MEYERS,
E. H. BICKERTON.